US006976255B1

(12) United States Patent
Clark et al.

(10) Patent No.: US 6,976,255 B1
(45) Date of Patent: Dec. 13, 2005

(54) STORAGE ISOLATION EMPLOYING SECURED SUBSPACE FACILITY

(75) Inventors: Carl E. Clark, Poughkeepsie, NY (US); Steven J. Greenspan, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/536,952

(22) Filed: Mar. 28, 2000

(51) Int. Cl.[7] .......... G06F 9/46
(52) U.S. Cl. .......... 718/100; 711/206
(58) Field of Search .......... 709/100, 101; 711/206, 163, 208–209; 713/200; 718/100, 718/101, 104

(56) References Cited

U.S. PATENT DOCUMENTS

| | | | | | |
|---|---|---|---|---|---|
| 4,979,098 | A | * | 12/1990 | Baum et al. | |
| 5,319,758 | A | * | 6/1994 | Arai et al. | 711/209 |
| 5,361,356 | A | * | 11/1994 | Clark et al. | 711/206 |
| 5,493,661 | A | * | 2/1996 | Alpert et al. | |
| 5,745,676 | A | * | 4/1998 | Hobson et al. | 713/200 |

FOREIGN PATENT DOCUMENTS

| | | | |
|---|---|---|---|
| JP | PUPA 01-228039 | 9/1989 | G06F 12/10 |
| JP | PUPA 06-083625 | 3/1994 | G06F 9/40 |
| JP | PUPA 06-083710 | 3/1994 | G06F 12/10 |
| JP | PUPA 06-095874 | 4/1994 | G06F 9/30 |

OTHER PUBLICATIONS

Hagimont, D., et al., "Protection in an Object-Oriented Distributed Virtual Machine," IEEE, Object Orientation in Operating Systems, 1992, pp. 273-277.

* cited by examiner

*Primary Examiner*—Thomas Lee
*Assistant Examiner*—George L. Opie
(74) *Attorney, Agent, or Firm*—Lily Neff, Esq.; Kevin P. Radigan, Esq.; Heslin Rothenberg Farley & Mesiti, P.C.

(57) ABSTRACT

A secured subspace facility is provided for ensuring isolated storage for transactions running under an operating system main task. Isolation is achieved by attaching, from an operating system task, subtasks that will restrict application addressing. The attaching includes defining a subspace address environment as home space within a dispatchable unit access list (DU-AL) associated with each attached subtask. Multiple subtasks can be attached with each subtask running applications in an isolated address subspace, notwithstanding execution of the applications in address register addressing mode.

31 Claims, 9 Drawing Sheets

STORAGE ISOLATION EMPLOYING SECURED SUBSPACE FACILITY

TECHNICAL FIELD

This invention enhances the reliability of computer system operation by isolating data (including programs) in virtual subspaces from programs and other virtual subspaces in the same subspace group. More particularly, this invention ensures subspace isolation notwithstanding execution of applications in address register addressing mode.

BACKGROUND OF THE INVENTION

It is common to have a family of programs and data that are intertwined in their relationship and their execution, such that a high rate of switching is essential among the different programs and there is shared use of the databases in the family. Such a family of programs and data are often supported by a software subsystem (operating under an operating system). The subsystem often handles a large number of transactions that are concurrently accessing a large number of different programs and databases in the family. For example, the transactions of banking tellers (both humans and machines) in a multi-branch banking complex may concurrently use deposit programs and withdrawal programs (that share the same database, i.e., customer accounts), credit check programs and their databases, and numerous other related banking programs and databases, all of which are being accessed concurrently by a set of transaction programs invoked by individual requests for service.

Such programs and data have been found to be usable at their fastest potential rate when they are all in a single address space (AS) being accessed from one or more CPUs. However, subsequent experience has indicated significant failures in the execution of such programs, due to incorrect store operations by an executing program wiping out part of another or a database. Such execution failures have temporarily terminated the operation of a multi-branch banking business dependent on such a system. A programming system failure that causes a temporary outage of an entire business is usually considered a non-tolerable option, regardless of its speed of operation. Also, incorrect store operations that do not result in a system failure, but invalidly modify data and perpetuate without being detected are non-tolerable, difficult to detect program failures.

One way to prevent such program failures is to isolate the different programs and databases from each other in their system, so that one program cannot access another program or database in the system. One such storage isolation approach is presented in commonly assigned U.S. Pat. No. 5,361,356, by Clark et al., entitled "Storage Isolation With Subspace-Group Facility," the entirety of which is hereby incorporated herein by reference.

In this prior patent, a Branch in Subspace Group (BSG) instruction is executed in problem state (for example by an application program) for providing a fast instruction branch between address spaces within a restricted group of address spaces called a subspace group. The subspace group contains two types of address spaces: a base space and any number of subspaces. The subspace group is set up in a control table associated with each dispatchable unit (DU). This DU control table contains: an identifier of a base space, an identifier of an access list that contains identifiers of all subspaces in the subspace group, an indicator of whether CPU control was last given to a subspace or to the base space, and an identifier of a last entered subspace in the group. The BSG instruction has an operand defining a general register containing the target virtual address and an associated access register containing an access-list-entry token (ALET) defining the target address space. The ALET indexes to a target subspace identifier in the access list, and then the associated virtual address locates the target instruction in the identified target address space. BSG instruction execution controls restrict the BSG branching only to an instruction in the subspace group.

Applicants have discovered that one restriction on the above-noted process is that secured subspace isolation was achieved only for primary and secondary space addressing, and not achieved for access register addressing while running with subspace active. Prohibiting the usage of access register addressing allows for a secure subspace environment, but limits the general applicability of secured subspaces on many systems, such as an International Business Machines S/390 Operating System. IBM markets a transaction manager which runs on S/390 and is referred to as Customer Information Systems (CICS). A CICS's direction to use subspaces for transaction isolation within an open transaction environment (OTE) for CICS applications would not be consistent nor acceptable unless access register addressing is available for the CICS applications and resource managers that the applications called.

In view of the above, applicants have discovered there is a need in the art to further extend the teachings of subspace isolation to allow usage thereof in an access register addressing mode with secured subspace isolation.

DISCLOSURE OF THE INVENTION

The shortcomings of the prior art are overcome and additional advantages are provided through the provision of a method for producing secured subspaces for transactions to be run. The method includes: from an operating system task, attaching a subtask that will restrict application addressing; and wherein the attaching includes defining a subspace address environment as home space within a dispatchable unit access list associated with the subtask.

In another aspect, this invention provides at least one program storage device readable by a machine, tangibly embodying at least one program of instructions executable by the machine to perform a method for producing a secure subspace for a transaction. The method includes: from an operating system task, attaching a subtask that will restrict application addressing; and wherein the attaching includes defining a subspace address environment as home space within a dispatchable unit access list associated with the subtask.

In a further aspect, a system is provided for producing a secure subspace for a transaction. The system includes means for attaching, from an operating system task, a subtask that will restrict application addressing. The means for attaching includes means for defining a subspace address environment within a dispatchable unit access list associated with the subtask.

To restate, provided herein is a technique for ensuring secured subspaces notwithstanding execution of applications in address register addressing mode. Secured subspaces provide an environment for a server, transaction manager or work manager to provide isolation and protection from multiple concurrent users, transactions or work requests running under separate tasks within a single address space. The server or manager's programs and data may be common to the multiple users and yet isolated and private from other servers or other address spaces allowing for the individual users or task to access the server or manager's functions and yet still have programs and data that are isolated and private to each individual task. If the user or task's application desires to create a multi-tasking environment itself, those additional tasks it creates will share the requesting application's subspace environment, while still being isolated and protected from other user subspace environments. The server or work manager may also use the facilities to provide isolation and protection of certain of its own programs and data from the users or work requests that it is processing.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In general, this invention defines a software structure which provides a subspace environment for secured subspace isolation and permits access register addressing when secured subspace is active. This is accomplished by defining the content of the dispatchable unit's (DU's) access list's entry (ALET) to contain the subspace's address space number (ASN) second table entry origin (SSASTEO). Subspace tasks can then be created with a secure addressing environment for programs running under those tasks in either primary, secondary or access register addressing mode.

Figure 1:
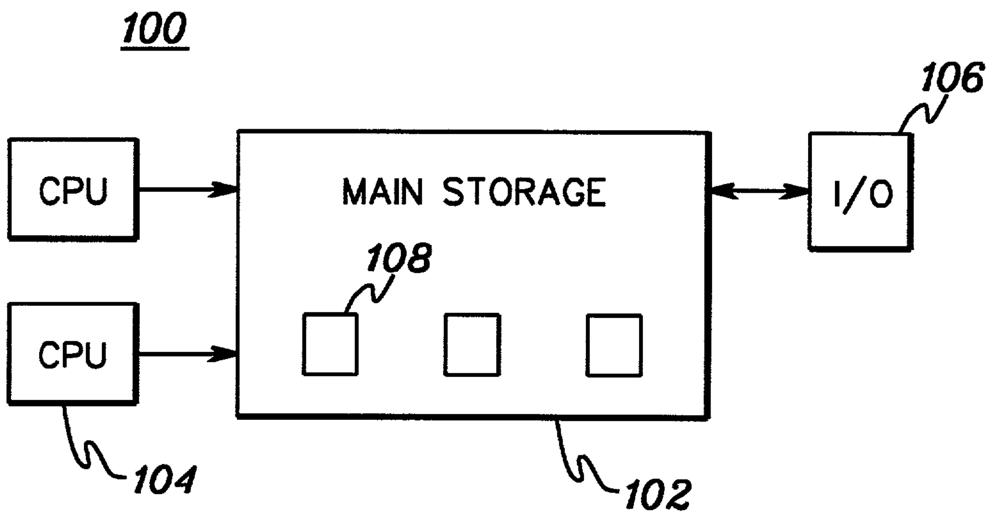
FIG. 1 depicts one example of a block diagram of hardware components of a system to employ a secure subspace facility in accordance with the principles of the present invention.

One embodiment of a computing environment incorporating and using the capabilities of the present invention is depicted at FIG. 1. Computing environment 100 is based, for instance, on the Enterprise Systems Architecture (ESA)/390 offered by International Business Machines Corporation, Armonk, N.Y. ESA/390 is described in an IBM publication entitled Enterprise Systems Architecture/390 Principles of Operation, IBM publication No. SA22-7201-04, Jun. 1997, which is hereby incorporated herein by reference in its entirety.

Computing environment 100 includes, for instance, a main storage 102, one or more central processing units (CPUs) 104 and one or more input/output (I/O) devices 106.

In general, input devices 106 are used to load data and/or programs into main storage 102, and central processing units 104 are used to access the stored programs or data from main storage. Main storage 102 includes one or more address spaces 108, where an address space is a consecutive sequence of integer numbers (or virtual addresses), together with the specific transformation parameters which allow each number to be associated with a byte location in storage. Typically, an entire virtual address space 108 is not resident within main storage. Instead, only that portion associated with a program or data being accessed or used by one or more of the processors is resident within the main storage.

An address space containing a currently dispatched task control block (TCB) or dispatchable unit is referred to herein as a base address space or base space. In a current implementation of the IBM OS/390 operating system, the base space is equivalent to the home address space (home space) which is described in detail in the above-incorporated IBM Principles of Operation publication. However, in other operating systems, the base space could be distinct from the home space. Also, reference U.S. Pat. No. 5,493,661, by Alpert et al., entitled "Method and System for Providing a Program Call to a Dispatchable Unit's Base Space", the entirety of which is hereby incorporated herein by reference.

Figure 2:
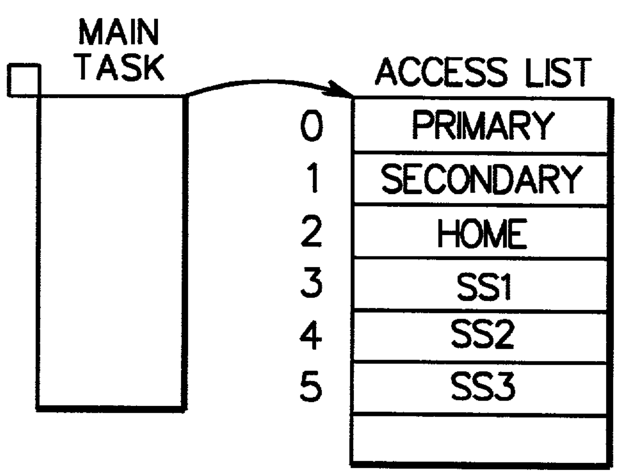
FIG. 2 depicts one embodiment of a main task and a dispatchable unit access list (DU-AL) structure associated therewith for a conventional transaction manager.

FIG. 2 depicts one embodiment of a main task arising under, for example, the above-discussed CICS transaction manager running on an IBM S/390 system. The main task has associated therewith a dispatchable unit-access list (herein referred to as a DU-AL) which identifies the address environment for the main task. In addition to primary and secondary addressing, the access list includes an access list entry (ALE 2) initialized with the home space address space table entry (ASTE) whenever a dispatchable unit is created (e.g., a task, its dispatchable unit control table (DUCT) and the associated DU-AL created through the ATTACH service described in an IBM publication entitled "IBM OS/390 MVS Assembler Services Reference", publication no. GC 28-1910-09, the entirety of which is hereby incorporated herein by reference). ALE 2 initialized with the home space ASTE enables any program running in access register mode to access the entire home space, within the boundaries of the key protection facilities. Typically, the home space and the base space comprise the same space. Addressing ranges in the base space can be reserved and separate ranges allocated exclusively to individual subspaces (defined in the above-incorporated S/390 Principles of Operation). This limits the addressing scope of programs running with subspace active to the ranges reserved for their current subspace. However, this isolation does not apply when the program runs in access register addressing mode. An ALET 2 in an access register (AR) qualified address provides the program addressing access to the home space, hence the base space and to all areas that the subspace should not be privileged to access. As noted above, the solution to this problem has been to restrict the transaction manager such that when in secured base space mode, access register addressing mode is unavailable.

In contrast, the solution presented herein achieves secured subspace isolation and allows access register addressing by attaching a subtask that will restrict application addressing. Specifically, the attaching includes defining a subspace address environment as home space within the dispatchable unit access list (DU-AL) associated with the subtask. By initializing the ALE 2 value to the subspace ASTE origin instead of the home space ASTE when the subtask and its DU-AL are created and initialized, the subtask is unable to access home space of the main task and therefore access register addressing can be employed. The addressability of any program running with subspace active will then be limited to its subspace addressing environment whether the program is running in primary or access register addressing mode. In one embodiment, the IBM S/390 ATTACH service is modified (as described below) to support an option to create tasks with a subspace addressing environment. The attaching task's current subspace environment then will be the subspace addressing environment used to initialize the attached task's DU-AL ALE 2 value to the subspace's ASTE origin.

In an OS/390 implementation, this structure is possible because the content of ALE 2 of the DU-AL is an S/390 software convention. This does not effect control register 13 (i.e., a hardware control register defined in the IBM S/390 Principles of Operations) which contains the home space segment table descriptor (STD). The CR 13 home space STD is architecturally defined and implemented by hardware to be used for address and instruction accesses whenever running in home space mode. Since programs must be authorized to SAC (i.e., a hardware instruction "Set Address Space Control" defined in the IBM S/390 Principles of Operations) to home-space mode, the secured subspace concept of isolation for problem state programs is not effected by keeping the current architecture definition of CR 13.

Note that the present invention is related in one aspect to the addressing capabilities within a subspace active environment. Architecture and hardware for a branch in subspace group is discussed in the above-incorporated U.S. Pat. No. 5,361,356.

Figure 3A:
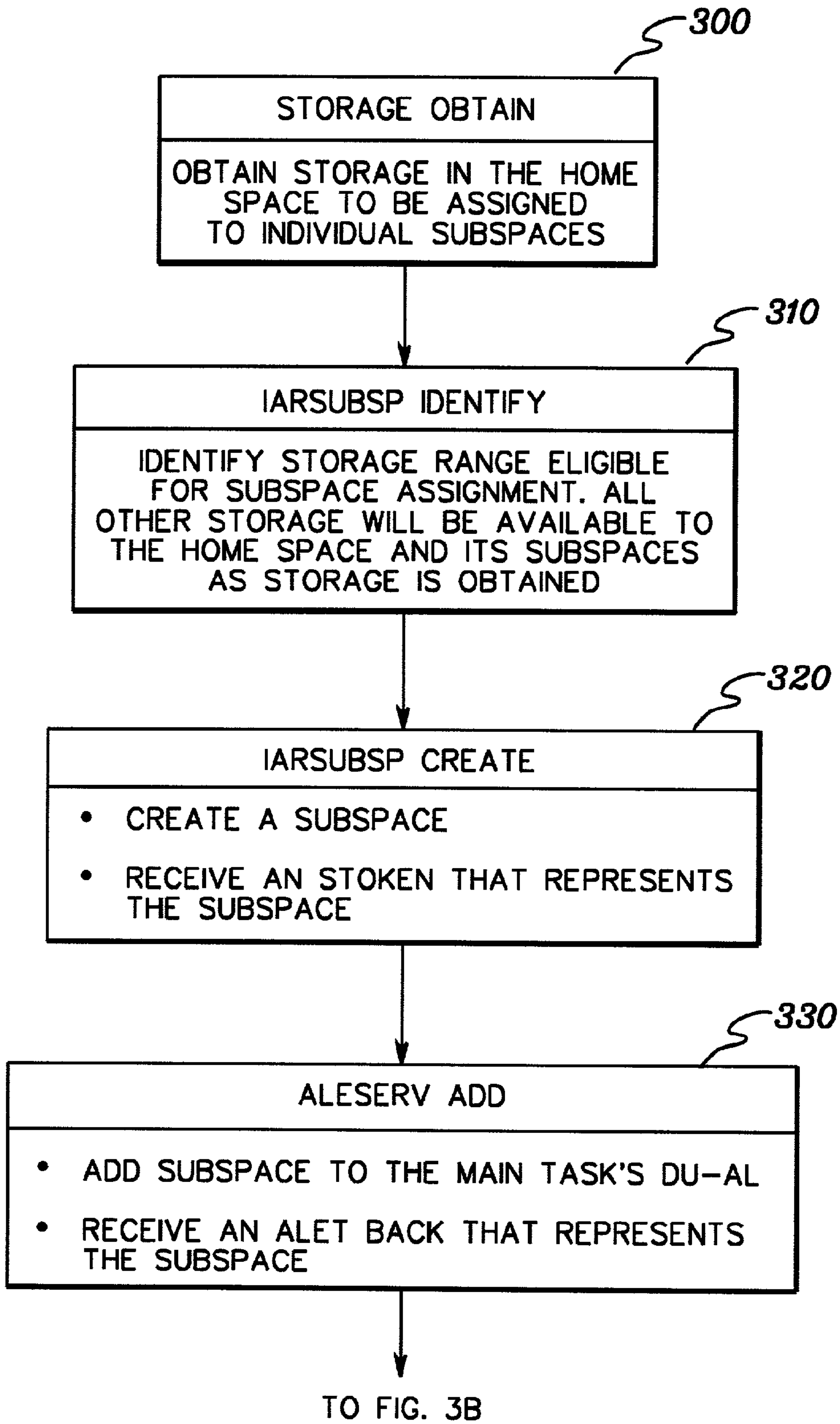
FIGS. 3A & 3B depict a flowchart of one embodiment for creating a secured subspace facility in accordance with the principles of the present invention.
Figure 3B:
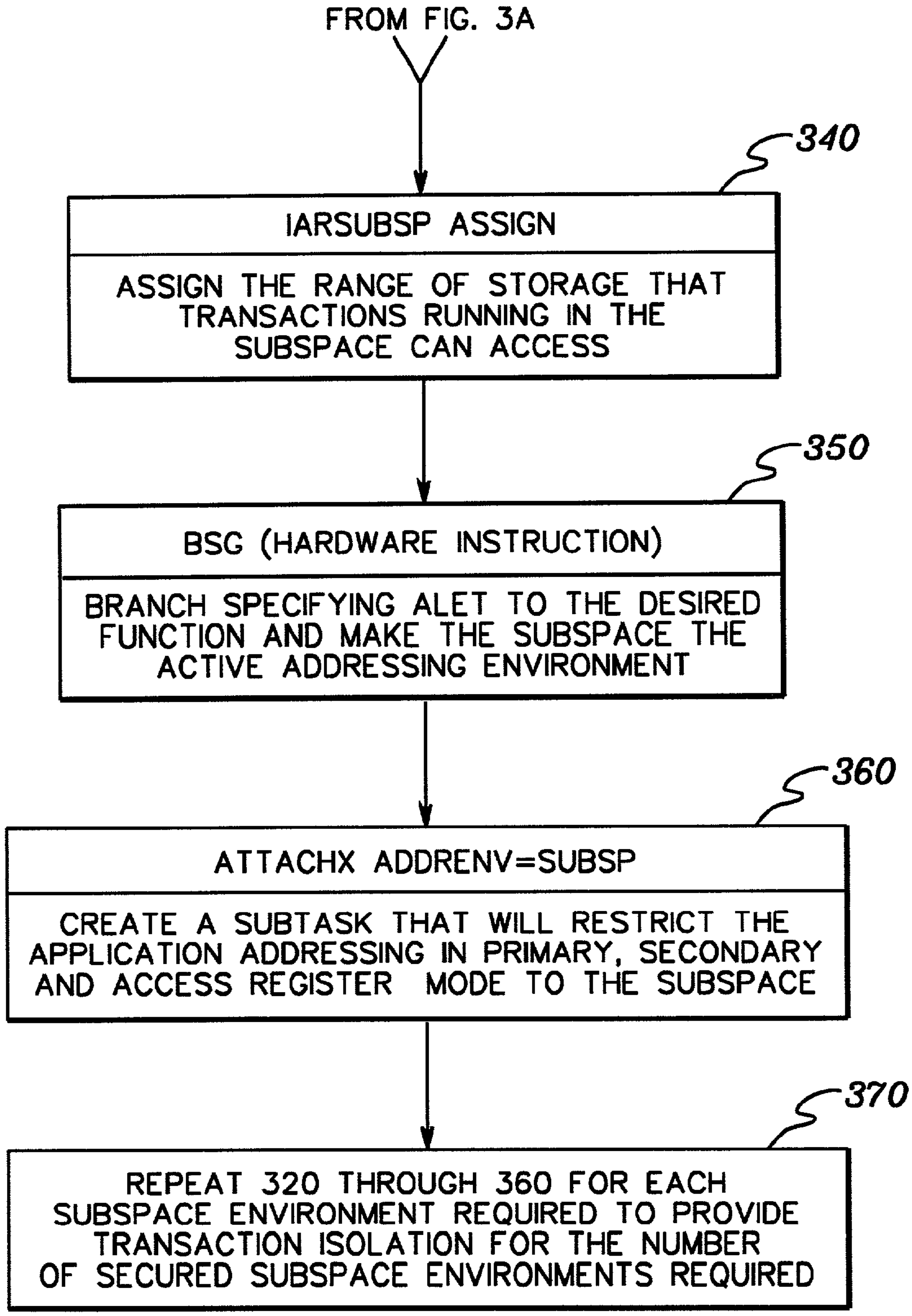

FIGS. 3A & 3B depict one embodiment for creating a secure subspace environment in accordance with the principles of the present invention. A task management function running under a main task can create a secured subspace environment for each transaction to be run in a transaction isolation environment wherein the transactions are unable to access each others' assigned memory. Under the main task, the transaction manager creates n subspaces by first obtaining storage in the home space to be assigned to individual subspaces 300. Note that as one embodiment, the functions depicted in FIGS. 3A & 3B and described herein are available with IBM's System 390 operating system, i.e., unless otherwise indicated. Also note that there is one home space/base space per CICS region that is started in the S/390 system. Next, the storage range eligible for subspace assignment is identified, for example, using the IBM OS/390 "IARSUBSP" service 310. All other storage will be available to the base space and its subspaces as storage is obtained.

Figure 4A:
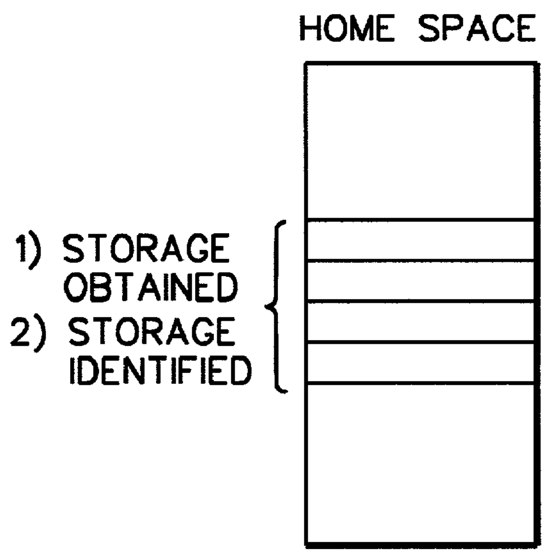
FIG. 4A depicts one embodiment of home/base space storage to be assigned to individual subspaces in accordance with the secured subspace facility embodiment of FIGS. 3A & 3B.

FIG. 4A depicts one embodiment of a home/base space showing four different areas of storage obtained and identified.

Figure 4B:
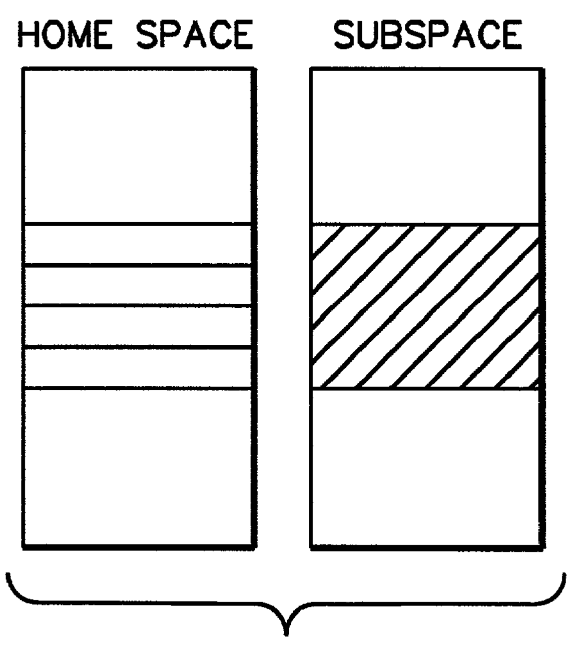
FIG. 4B depicts one embodiment of home space storage and associated subspace assignment in accordance with the secured subspace facility embodiment of FIGS. 3A & 3B.

Next, a subspace is created, for example, using the "IARSUBSP" create service of the OS/390 system 320. A space token (STOKEN) is received that represents the subspace. Note that the identified range is not made available to the subspace. FIG. 4B depicts one embodiment of a home space having four ranges A, B, C & D and an associated subspace showing that the corresponding ranges are not yet addressable in the subspace.

Figure 4C:
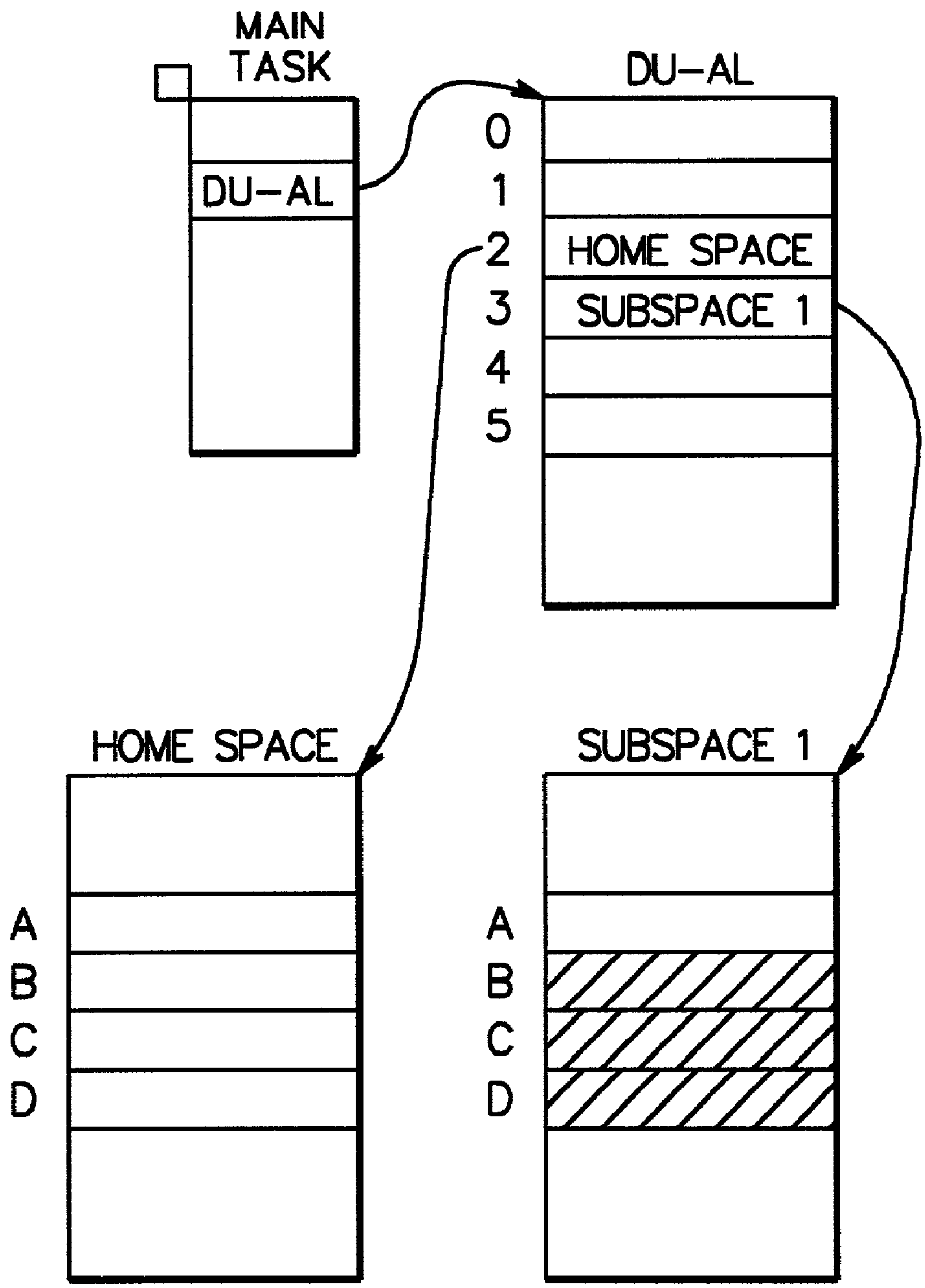
FIG. 4C depicts one embodiment of a main task, its associated dispatchable unit access list, and home space and subspace assignment in accordance with the secured subspace facility embodiment of FIGS. 3A & 3B.

A subspace is thereafter added to the main task's DU-AL, for example, using the OS/390 "ALESERV" (access list entry) ADD service 330. An ALET is received back that represents the subspace, for example, ALET 3 as shown in FIG. 4C, wherein the subspace is now labeled subspace 1.

A range of storage that transactions running in the subspace can access is assigned, e.g., using the OS/390 "IARSUBSP" assign service 340. For example, the service allocates and assigns storage A and makes that valid in subspace 1 as shown in FIG. 4C, wherein the crosshatch signifies not valid.

A branch specifying the access list entry (ALE) to the desired function is next performed which makes the subspace the active addressing environment. In one embodiment, this comprises a BSG hardware instruction 350. Note that after the BSG instruction, the subspace (for example, subspace 1 of FIG. 4C) becomes the active primary and secondary address space for the task. All instructions and data accesses from primary or secondary addressing will come from and be limited to the subspace's addressing range. However, an application at this point in access register addressing mode can still address the home space via ALET 2. This issue is addressed by the present invention.

As noted above, the solution presented herein to attach a subtask that will restrict application addressing 360. A subtask can be attached for each transaction to be run using secured subspaces. Each attached subtask has a subspace address environment as home space within the dispatchable unit access list associated with that subtask. The result is shared subspaces between the subtask and the main task, but isolated subspaces between independently attached subtasks. The ability to share subspaces is provided, in one example, through the IBM OS/390 Attach service described in the above-incorporated IBM OS/390 MVS Assembler Services Reference publication. However, a new parameter "ADDRENV" is defined as described herein for the ATTACHX macro. The ATTACHX macro is a means for programs to request the IBM OS/390 Attach Service. This new parameter permits a task that has created a subspace to attach a subtask and limit the addressability of the subtask to the addressing environment defined by the subspace. Subtasks attached with this subspace limited addressability can be designated as "subspace tasks". Subspace tasks can only attach tasks that are also subspace tasks. This new ATTACHX parameter, supports two options, namely, ADDRENV=SAME and ADDRENV=SUBSP. ADDRENV=SAME specifies that the attached task will be attached with the same primary mode addressing environment of the attaching task. The primary mode addressing environment is exclusive of the addressing environment that can be created through the IBM OS/390 ALCOPY service processing for the DU-AL addressing environment. The attached task's home ALET (ALET 2) ASTE designation for an ADDRENV=SAME request will be the same ASTE designation as the home ALET of the attaching task.

ADDRENV=SUBSP specifies that the attached task will be attached with the subspace addressing environment that was active when the attach was issued. The task issuing the ATTACHX request must own the subspace and establish the subspace as the current active subspace before issuing the ATTACHX. The new task will be attached with subspace active and have an addressing environment limited to the addresses accessible to that subspace. The ATTACH service will designate the task as a subspace task.

These subspace tasks are limited to attaching only subspace tasks with the SAME or a new SUBSP addressing environment. A subspace task cannot attach a base/space task, e.g., a task that is not a subspace task.

When a task is attached with ADDRENV=SUBSP, the attached task will receive control with the SUBSPACE as the active subspace. The home ALET of the task will be set to the SUBSPACE'S ASTE. An AR-qualified address specifying the home ALET will designate the subspace and its addressing environment. A task running with subspace-active is either the owner of the subspace or is an attached subspace task created by the owner of the subspace. A subspace task could also attach another subspace task with the subspace being shared with that task. However, the owning task of the subspace is still the parent or guardian task of any subspace task using that subspace. Therefore, the owning task cannot terminate and delete the subspace until the subspace tasks using the subspace have terminated.

This structure guarantees that a subspace owning task will not terminate and attempt to delete the subspace if there are any subtasks actively using the subspace. This simplifies the process and serialization for managing the deletion of subspaces.

By way of example, in the IBM CICS transaction server open transaction environment (OTE), an open CICS application has the option to be run under an OTE task. This task will be created as a subspace task by the CICS main or quasi/re-entrant (Q/R) task. The Q/R task will create many OTE tasks and each one will be created as a subspace task with its own subspace to provide transaction isolation between the multiple transactions. The Q/R task will own the subspaces that define the addressing environments for the open transactions. A transaction will run under an OTE task with the subspace protection. However, if the transaction requests a CICS function that has not been rewritten as a re-entrant function, CICS will move the transaction to the Q/R task and run the function under the Q/R task. When this transaction runs under the Q/R, its subspace environment will be made active by CICS identifying the subspace on its DU-AL (the Q/R task's dispatchable unit's access list) that is associated with the transaction and then branching (BSG) to that subspace. Subspace sharing allows this to be done. Without subspace sharing, the subspace's designation would have to be moved from the OTE task's access list to the Q/R task's access list and vise/versa.

Figure 4D:
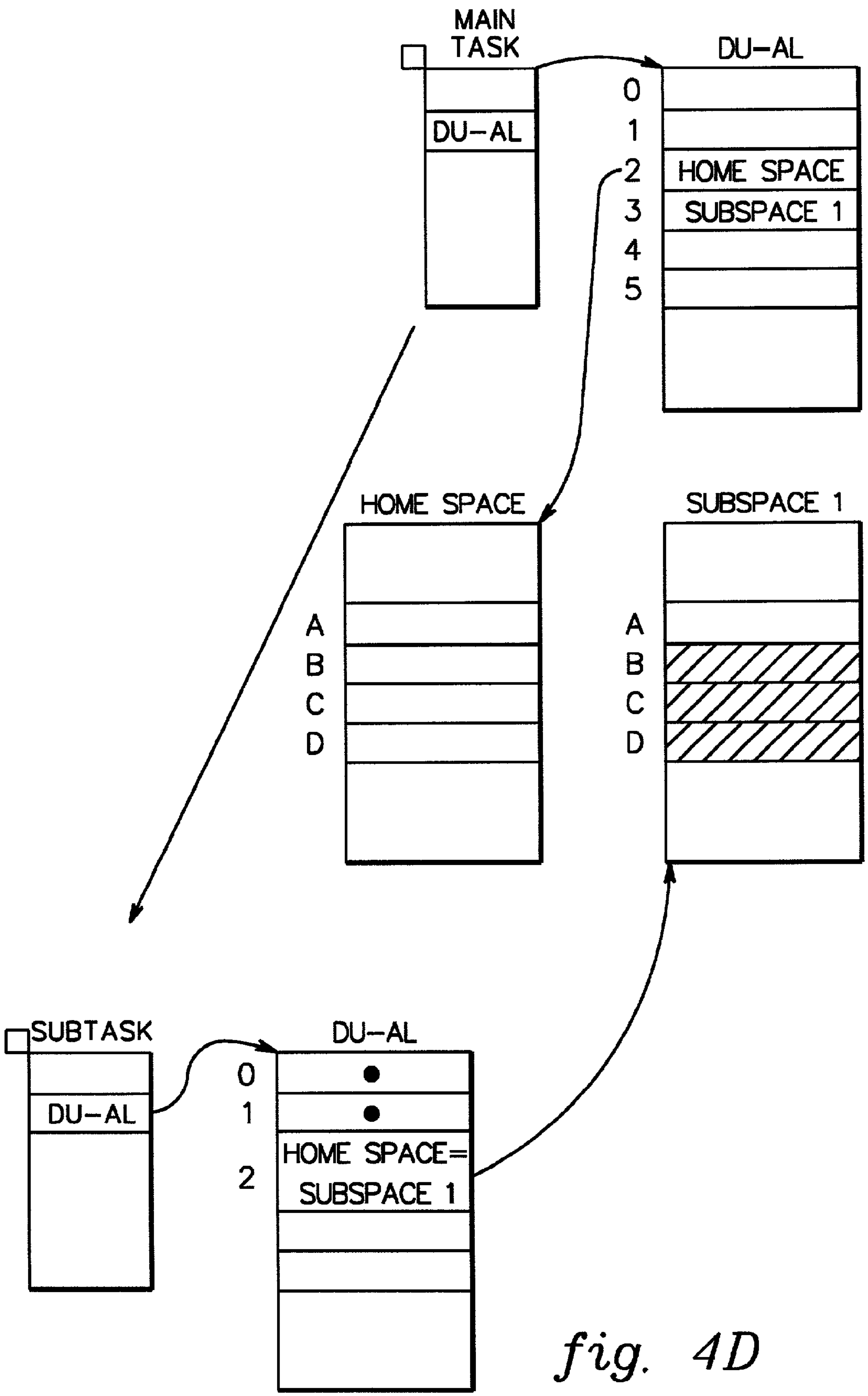
FIG. 4D depicts one embodiment of the structures of FIG. 4C further depicting creation of a subtask from the main task and an associated DU-AL wherein home space is assigned subspace 1 in accordance with the secured subspace facility embodiment of FIGS. 3A & 3B and the principles of the present invention.

Returning to FIG. 3B, by using the above-described attach function, a subtask is created that will restrict application addressing in primary, secondary and access register mode to the subspace. By way of example, this structure can be attained using the IBM OS/390 ATTACHX service discussed above wherein the home space of the dispatchable unit access list associated with the subtask is assigned the subspace address environment (reference FIG. 4D). Note that when the application receives control running under the subtask, the application will be limited such that it cannot access other subspaces/transaction areas (e.g., B, C & D in FIG. 4D) when employing primary, secondary or access register mode addressing and when subspace is active. The utilization of the subspace as the subtask's home space (ALET 2) permits base control programs to continue to access base control program (BCP) structures using ALET 2, but restricts addressing storage not assigned to the subspace. Hence, the application running under the subtask will not be able to access other transactions/application addressable areas.

The processing of FIGS. 3A & 3B, and in particular STEPS 320–360, is repeated for each subspace environment required to provide transaction isolation, 370.

Figure 5:
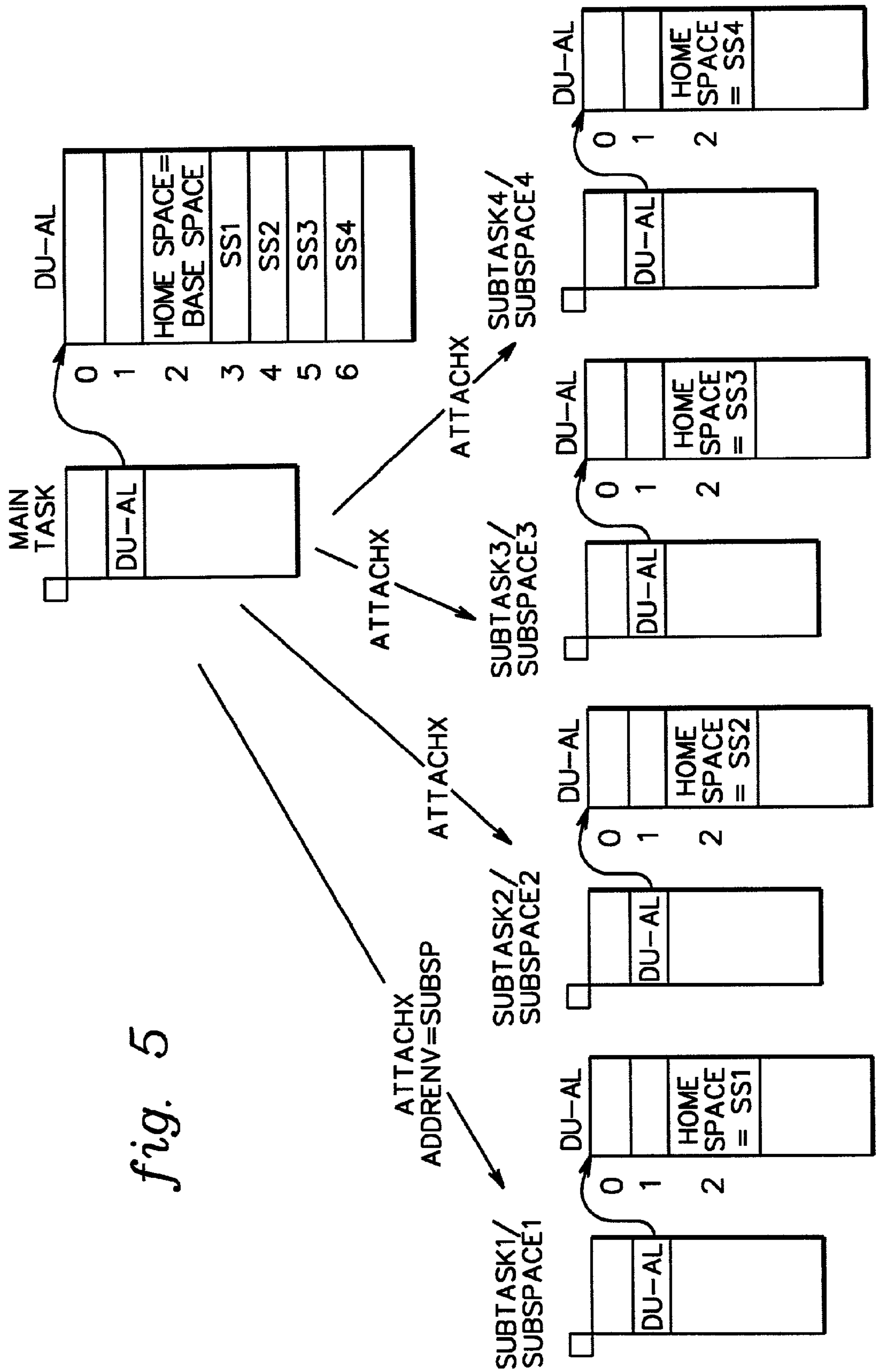
FIG. 5 depicts one embodiment of a main task, its associated DU-AL and four associated subtasks each having a home space defined in an associated DU-AL as a different subspace in accordance with the secured subspace facility embodiment of FIGS. 3A & 3B and the principles of the present invention.
Figure 6:
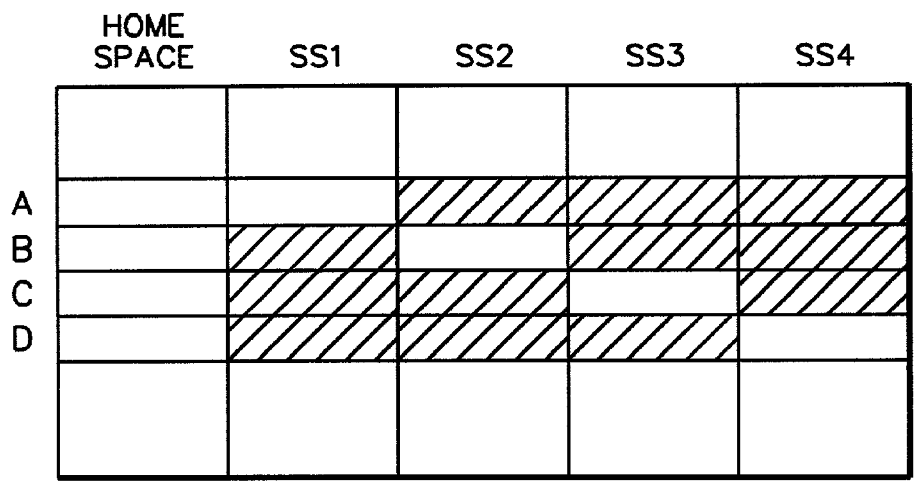
FIG. 6 graphically depicts one embodiment of secured subspace isolation attained in accordance with the principles of the present invention employing, for example, four subtasks as depicted in FIG. 5.

FIG. 5 depicts one example of the results from repeating STEPS 320–360 for four different subtasks, and shows their secured subspace environments such that transaction/applications running under the individual subtasks are restricted from accessing the assigned storage of the transactions/applications running under different subtasks. For example, as shown in FIG. 6, applications under subtask1 cannot address assigned storage areas B, C & D. Applications under subtask2 cannot address assigned storage areas A, C & D. Applications under subtask3 cannot address assigned storage areas A, B & D and applications under subtask4 cannot address assigned storage areas A, B & C. Again, each defined subtask has an associated dispatchable unit access list with the corresponding subspace defined as home space in ALET 2 as shown in FIG. 5.

Figure 7:
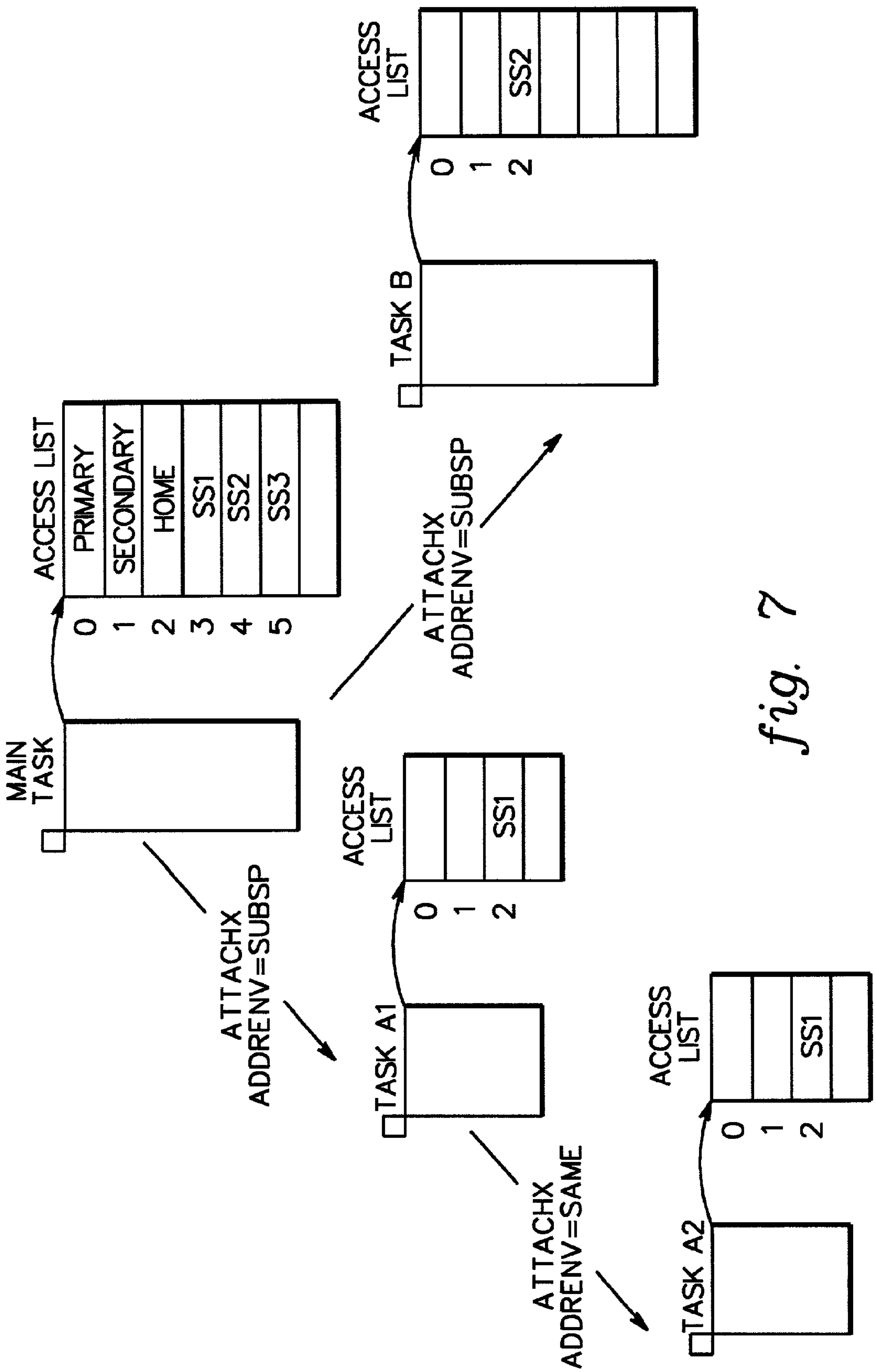
FIG. 7 depicts one embodiment of a main task, associated dispatchable unit access list, and multiple subtask generation in accordance with the secured subspace facility embodiment of FIGS. 3A & 3B and the principles of the present invention.

FIG. 7 depicts one embodiment of the main task and its associated access list of FIG. 1, which again employs secured subspaces in accordance with the principles of the present invention. In this embodiment, the main task attaches a first subtask (task A1) and a second subtask (task B) directly, for example, using the above-described modified ATTACHX service of the IBM OS/390 system. The address environment in these attaches is defined as ADDRENV=SUBSP. In both the access list for task A1 and the access list for task B, the home space is defined as a corresponding subspace (SS1, SS2 respectively). A transaction running under task A1 can itself create a subtask, for example, task A2. However, task A2 is defined to have the same address environment as task A1, i.e., subspace1. This feature is advantageous in that applications can create a multi-tasking environment themselves. All subtasks created in this environment are limited to sharing the subspace of the attaching task.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computerized method for producing a secure subspace for a transaction, said method comprising:

from an operating system task having an associated dispatchable unit access list (DU-AL) with a plurality of subspace address environments and home space defined as base space, attaching a subtask that will restrict application addressing; and wherein said attaching includes defining one subspace address environment of the plurality of subspace address environments as home space within a dispatchable unit access list (DU-AL) associated with said subtask, and wherein the DU-AL associated with the subtask includes only the home space definition.

2. The method of claim 1, wherein said subtask comprises a first subtask, said subspace comprises a first subspace and a first application runs under said first subtask, and wherein said method further comprises repeating said attaching to define a second subtask having a second subspace address environment as home space within a DU-AL associated with said second subtask, wherein a second application runs under said second subtask.

3. The method of claim 2, wherein said first subspace is isolated from said second application and said second subspace is isolated from said first application notwithstanding execution of said first application or said second application in address register addressing mode.

4. The method of claim 2, wherein said operating system task and said first subtask share said first subspace, and said operating system task and said second subtask share said second subspace.

5. The method of claim 2, further comprising repeating said subtask attaching for n additional subtasks, each subtask of said n additional subtasks having a different subspace address environment as home space within its associated DU-AL, wherein each subspace of said first, second and n additional subtasks is isolated from an application running under any other subtask of said first, second and n additional subtasks.

6. The method of claim 5, wherein each subspace address environment of said first, second and n additional subtasks comprises a different subspace of an address environment of said operating system task.

7. The method of claim 1, further comprising prior to said attaching:

creating said subspace;

adding said subspace to a DU-AL associated with said operating system task;

assigning a range of storage that an application running in the subspace can access; and performing a branch in subspace group (BSG) to make the subspace the active addressing environment.

8. The method of claim 7, wherein said performing the BSG comprises employing a BSG instruction to specify an access list entry (ALET) in the DU-AL associated with said operating system task.

9. The method of claim 1, wherein said subtask comprises a first subtask and a first application runs under said first subtask and wherein said method further comprises creating a second subtask from said first subtask, said creating comprising from said first subtask, attaching said second subtask thereto, said second subtask also having said subspace address environment as home space within a DU-AL associated therewith, wherein said subspace is shared by said operating system task, said first subtask and said second subtask.

10. The method of claim 9, wherein said subspace comprises a first subspace, and said method further comprises repeating said attaching from said operating system task to define a third subtask having a second subspace address environment as home space within a DU-AL associated with said third subtask, wherein a second application runs under said third subtask, and wherein said first application and said second application are unable to access each other's address environment notwithstanding execution thereof in address register addressing mode.

11. At least one program storage device readable by a machine, tangibly embodying at least one program of instructions executable by the machine to perform a method for producing a secure subspace for a transaction, said method comprising:

from an operating system task having an associated dispatchable unit access list (DU-AL) with a plurality of subspace address environments and home space defined as base space, attaching a subtask that will restrict application addressing; and wherein said attaching includes defining one subspace address environment of the plurality of subspace address environments as home space within a dispatchable unit access list (DU-AL) associated with said subtask, and wherein the DU-AL associated with the subtask includes only the home space definition.

12. The at least one program storage device of claim 11, wherein said subtask comprises a first subtask, said subspace comprises a first subspace and a first application runs under said first subtask, and wherein said method further comprises repeating said attaching to define a second subtask having a second subspace address environment as home space within a DU-AL associated with said second subtask, wherein a second application runs under said second subtask.

13. The at least one program storage device of claim 12, wherein said first subspace is isolated from said second application and said second subspace is isolated from said first application notwithstanding execution of said first application or said second application in address register addressing mode.

14. The at least one program storage device of claim 12, wherein said operating system task and said first subtask share said first subspace, and said operating system task and said second subtask share said second subspace.

15. The at least one program storage device of claim 12, further comprising repeating said subtask attaching for n additional subtasks, each subtask of said n additional subtasks having a different subspace address environment as home space within its associated DU-AL, wherein each subspace of said first, second and n additional subtasks is isolated from an application running under any other subtask of said first, second and n additional subtasks.

16. The at least one program storage device of claim 15, wherein each subspace address environment of said first, second and n additional subtasks comprises a different subspace of an address environment of said operating system task.

17. The at least one program storage device of claim 11, further comprising prior to said attaching:

creating said subspace;

adding said subspace to a DU-AL associated with said operating system task;

assigning a range of storage that an application running in the subspace can access; and performing a branch in subspace group (BSG) to make the subspace the active addressing environment.

18. The at least one program storage device of claim 17, wherein said performing the BSG comprises employing a BSG instruction to specify an access list entry (ALET) in the DU-AL associated with said operating system task.

19. The at least one program storage device of claim 11, wherein said subtask comprises a first subtask and a first application runs under said first subtask and wherein said method further comprises creating a second subtask from said first subtask, said creating comprising from said first subtask, attaching said second subtask thereto, said second subtask also having said subspace address environment as home space within a DU-AL associated therewith, wherein said subspace is shared by said operating system task, said first subtask and said second subtask.

20. The at least one program storage device of claim 19, wherein said subspace comprises a first subspace, and said method further comprises repeating said attaching from said operating system task to define a third subtask having a second subspace address environment as home space within a DU-AL associated with said third subtask, wherein a second application runs under said third subtask, and wherein said first application and said second application are unable to access each other's address environment notwithstanding execution thereof in address register addressing mode.

21. A system for producing a secure subspace for a transaction, said system comprising:

means for attaching, from an operating system task having an associated dispatchable unit access list (DU-AL) with a plurality of subspace address environments and home space defined as base space, a subtask that will restrict application addressing; and wherein said means for attaching includes means for defining a one subspace address environment of the plurality of subspace address environments as home space within a dispatchable unit access list (DU-AL) associated with said subtask, and wherein the DU-AL associated with the subtask includes only the home space definition.

22. The system of claim 21, wherein said subtask comprises a first subtask, said subspace comprises a first subspace and a first application runs under said first subtask, and wherein said system further comprises means for repeating said attaching to define a second subtask having a second subspace address environment as home space within a DU-AL associated with said second subtask, wherein a second application runs under said second subtask.

23. The system of claim 22, wherein said first subspace is isolated from said second application and said second subspace is isolated from said first application notwithstanding execution of said first application or said second application in address register addressing mode.

24. The system of claim 22, wherein said operating system task and said first subtask share said first subspace, and said operating system task and said second subtask share said second subspace.

25. The system of claim 22, further comprising means for repeating said subtask attaching for n additional subtasks, each subtask of said n additional subtasks having a different subspace address environment as home space within its associated DU-AL, wherein each subspace of said first, second and n additional subtasks is isolated from an application running under any other subtask of said first, second and n additional subtasks.

26. The system of claim 25, wherein each subspace address environment of said first, second and n additional subtasks comprises a different subspace of an address environment of said operating system task.

27. The system of claim 21, further comprising prior to said means for attaching:

means for creating said subspace;

means for adding said subspace to a DU-AL associated with said operating system task;

means for assigning a range of storage that an application running in the subspace can access; and means for performing a branch in subspace group (BSG) to make the subspace the active addressing environment.

28. The system of claim 27, wherein said means for performing the BSG comprises means for employing a BSG instruction to specify an access list entry (ALET) in the DU-AL associated with said operating system task.

29. The system of claim 21, wherein said subtask comprises a first subtask and a first application runs under said first subtask and wherein said system further comprises means for creating a second subtask from said first subtask, said means for creating comprising means for attaching said second subtask to said first subtask, said second subtask also having said subspace address environment as home space within a DU-AL associated therewith, wherein said subspace is shared by said operating system task, said first subtask and said second subtask.

30. The system of claim 29, wherein said subspace comprises a first subspace, and said system further comprises means for repeating said means for attaching from said operating system task to define a third subtask having a second subspace address environment as home space within a DU-AL associated with said third subtask, wherein a second application runs under said third subtask, and wherein said first application and said second application are unable to access each other's address environment notwithstanding execution thereof in address register addressing mode.

31. A system for producing a secure subspace for a transaction, said system comprising:

an operating system transaction manager adapted to attach a subtask to an operating system task having an associated dispatchable unit access list (DU-AL) with a plurality of subspace address environments and home space defined as base space, wherein said subtask restricts application addressing; and wherein said attach includes said operating system transaction manager being adapted to define a one subspace address environment of the plurality of subspace address environments as home space within a dispatchable unit access list (DU-AL) associated with said subtask, and wherein the DU-AL associated with the subtask includes only the home space definition.

* * * * *